United States Patent [19]

Küter, deceased et al.

[11] Patent Number: 4,480,204
[45] Date of Patent: Oct. 30, 1984

[54] APPARATUS FOR THE CONTACTLESS AND BRUSHLESS TRANSMISSION OF MEASURING AND CONTROL SIGNALS

[75] Inventors: Heinrich Küter, deceased, late of Bochum, Fed. Rep. of Germany, by Gerda Küter, Marlies Küter, Albert Küter, Rudolf Küter, heirs; Jürgen Klaar, Neukirchen-Vluyn, Fed. Rep. of Germany

[73] Assignee: Kraftwerk Union Aktiengesellschaft, Mülheim/Ruhr, Fed. Rep. of Germany

[21] Appl. No.: 468,555

[22] Filed: Feb. 22, 1983

[30] Foreign Application Priority Data

Feb. 22, 1982 [DE] Fed. Rep. of Germany ....... 3206338

[51] Int. Cl.³ ............................................ H02K 11/00
[52] U.S. Cl. ..................................... 310/68 R; 310/72
[58] Field of Search ................. 310/59, 68 R, 72, 266, 310/127, 136, 143, 148, 230, 236, 241, 84, 160, 168, 169, 68 D, 70; 336/120–123; 318/653

[56] References Cited

U.S. PATENT DOCUMENTS 3,940,644 2/1976 Manz .................................... 310/136
3,965,379 6/1976 Meusel et al. ..................... 310/68 R

FOREIGN PATENT DOCUMENTS 496961 8/1954 Italy ..................................... 310/136

Primary Examiner—J. D. Miller
Assistant Examiner—D. L. Rebsch
Attorney, Agent, or Firm—Herbert L. Lerner; Laurence A. Greenberg

[57] ABSTRACT

Apparatus for the contactless and brushless transmission of measuring and control signals by generators with rotating rectifier or thyristor excitation, including a shaft having an outer surface, a driving collar integral with the shaft, a shrouding ring lying at ground potential being integral with the driving collar and rotationally fixed relative to the shaft, the shrouding ring having a given axial range and an outer surface, a first and a second inductive signal transmission apparatus each including respective stationary and rotating parts, the second signal transmission apparatus being disposed concentrically within the first signal transmission apparatus in the given axial range of the shrouding ring, the rotating part of the first signal transmission apparatus being disposed on the outer surface of the shrouding ring, and the rotating part of the second signal transmission apparatus being disposed on the outer surface of the shaft.

7 Claims, 3 Drawing Figures

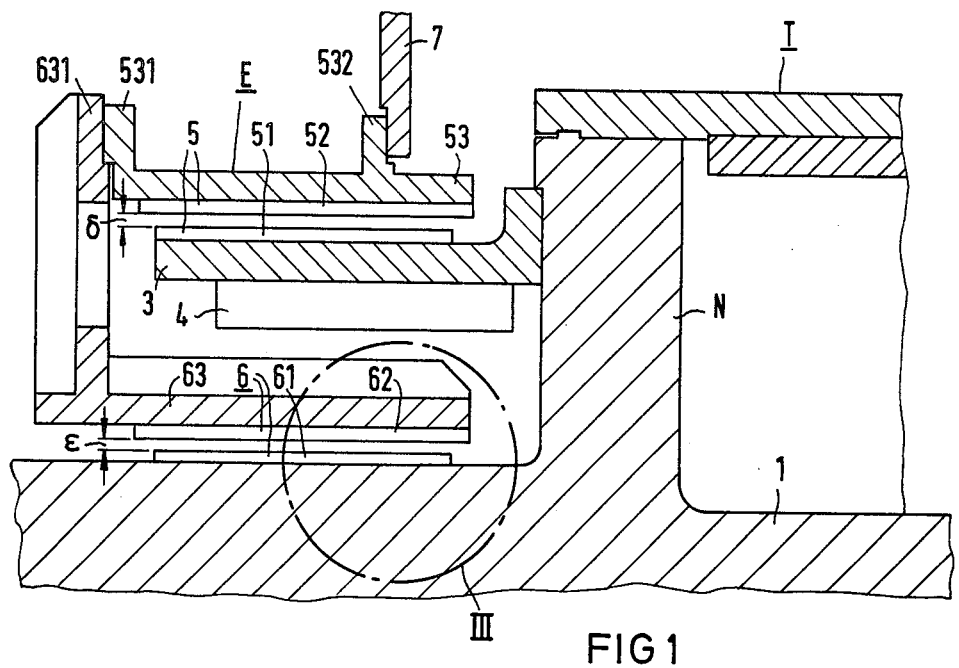
FIG 1
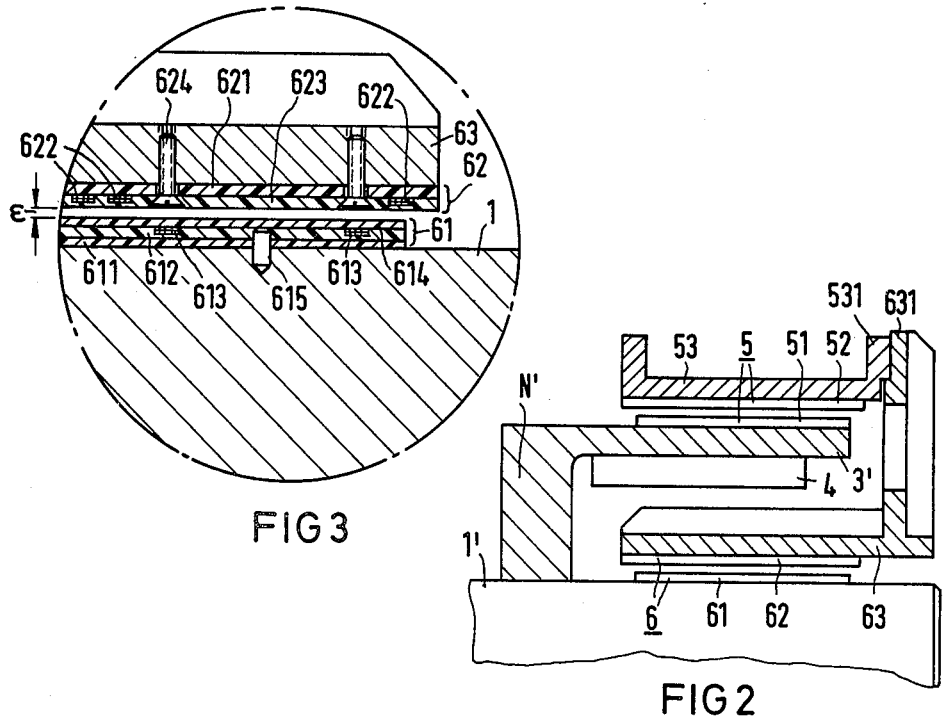
FIG 3
FIG 2

APPARATUS FOR THE CONTACTLESS AND BRUSHLESS TRANSMISSION OF MEASURING AND CONTROL SIGNALS

The invention relates to an apparatus for the contactless and brushless transmission of measuring and control signals by generators with rotating rectifier excitation or thyristor excitation, including two inductive signal transmission apparatus each having a respective stationary and rotating part, the rotating part of the first signal transmission apparatus being mounted to the outer periphery of a shrouding ring being rotationally fixedly connected to a shaft through a driving collar.

Such an apparatus is known from German Published, Non-Prosecuted Application DE-OS 23 59 578 corresponding to U.S. Pat. No. 3,965,379. In the case of this known apparatus, a positive wheel is provided for the positive potential of the exciting current and a negative wheel is provided for the negative potential of the exciting current. Each of these current converter wheels have a shrouding ring and a driving collar, which is insulated with respect to the shaft. The power components are mounted at the inner periphery of the shrouding ring. At the outer periphery of the shrouding rings of the positive and negative wheels, the rotating parts of respective first and second inductive transmission apparatus are mounted, the stationary parts thereof being supported in the machine housing. However, the shrouding rings simultaneously act as direct current collecting lines which are connected over the insulated driving collars that are disposed on the shaft, and radial current supply bolts are connected with the appropriate direct current lines, which extend axially in the shaft. With the known apparatus, the transmission of high frequency control signals can be effected in such a way that high power currents with voltage peaks are conducted through the shrouding rings and the driving collars. In addition, a comparatively large axial reach of the known apparatus results because of the axial side by side disposition of the positive and negative wheels, and the first and second inductive signal transmission apparatus, respectively, with regard to the critical bending or critical torsioning speed, which can lead to difficulties.

It is accordingly an object of the invention to provide an apparatus for the contactless and brushless transmission of measuring and control signals, which overcomes the hereinafore-mentioned disadvantages of the heretofore-known apparatus of this general type, and to provide a compact construction of the two inductive signal transmission apparatus in such a way that an undisturbed signal transmission is guaranteed.

With the foregoing and other objects in view there is provided, in accordance with the invention, apparatus for the contactless and brushless transmission of measuring and control signals by generators with rotating rectifier or thyristor excitation, comprising a shaft having an outer surface, a driving collar or hub integral with the shaft, a shrouding ring lying at ground potential being integral with the driving collar and rotationally fixed relative to the shaft, the shrouding ring having a given axial range and an outer surface, a first and a second inductive signal transmission apparatus each including respective stationary and rotating parts, the second signal transmission apparatus being disposed concentrically within the first signal transmission apparatus in the given axial range of the shrouding ring, the rotating part of the first signal transmission apparatus being disposed on the outer surface of the shrouding ring, and the rotating part of the second signal transmission apparatus being disposed on the outer surface of the shaft.

The apparatus according to the invention provides, through the packaging of the two inductive signal transmission apparatus, an especially compact and space-saving type of construction, whereby a mutual interference of the two inductive signal transmission apparatus and a disturbance of the signal transmission because of other exterior influences is prevented through the shielding effect of the shrouding ring, which lies at ground potential.

In accordance with another feature of the invention, there is provided a machine housing, a support cylinder being supported by the machine housing and having an inner surface, the stationary part of the first signal transmission apparatus being disposed on the inner surface of the support cylinder.

In accordance with a further feature of the invention, there is provided another support cylinder being supported concentrically in the first-mentioned support cylinder and having an inner surface, the stationary part of the second signal transmission apparatus being disposed on the inner surface of the other support cylinder.

In accordance with an added feature of the invention, there are provided two flanges each being disposed on a respective one of the support cylinders, the flanges being connected to each other outside the given axial range of the shrouding ring.

In accordance with an additional feature of the invention, both of the support cylinders are at ground potential.

In accordance with still another feature of the invention, the rotating part of the first signal transmission apparatus is formed of a coil carrier being banded to the shrouding ring and having an outer surface with grooves formed therein and coils disposed in the grooves, and the rotating part of the second signal transmission apparatus is formed of a coil carrier being banded to the shaft and having an outer surface with grooves formed therein and coils disposed in the grooves.

In accordance with still a further feature of the invention, the shrouding ring has an inner surface, and including structural units disposed on the inner surface for containing measuring, control and supply electronics for the rotating rectifier or thyristor excitation.

In accordance with still an added feature of the invention, the inner surface of the shrouding ring is in the form of a polygon having flat surfaces, each having a respective one of the structural units disposed thereon.

In accordance with still an additional feature of the invention, the shaft has an end and is part of an exciter machine having a rotating rectifier apparatus, the driving collar is disposed on the opposite side of the rotating rectifier apparatus of the exciter machine in vicinity of the end of the shaft and the shrouding ring is extended toward the end of the shaft in axial direction.

In accordance with a concomitant feature of the invention, the driving collar which is at ground potential has two sides, and including a thyristor wheel disposed on one of the sides of the driving collar, the shrouding ring containing the power components for the rotating thyristor excitation on the inner surface thereof being disposed on the other of the sides of the driving collar.

Other features which are considered as a characteristic for the invention are set forth in the appended claims.

Although the invention is illustrated and described herein as embodied in an apparatus for the contactless and brushless transmission of measuring and control signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary, longitudinal-sectional view of an apparatus for contactless and brushless signal transmission with rotating thyristor excitation;

FIG. 2 is another longitudinal-sectional view of an apparatus for contactless and brushless signal transmission with a rotating rectifier; and FIG. 3 is an enlarged, detailed view of the area III of the construction of the stationary and rotating part of an inductive signal transmission apparatus of FIG. 1.

Referring now to the figures of the drawing in detail, and first particularly to FIG. 1 thereof, there is seen a very simplified diagrammatic representation of an apparatus for the transmission of measuring and control signals in the case of rotating thyristor excitation. The rotating thyristor excitation generally is formed by a thyristor wheel T, which carries all power components and an electronic wheel E, which carries the measuring, control, and supply electronics. The thyristor wheel T and the electronic wheel E have a common driving collar N, which is attached to a shaft 1 of the exciter structure. The common driving collar N is situated over the shaft 1, and a non-illustrated ground brush lies at ground potential so that the measuring, control and supply electronics of the electronic wheel E are effectively shielded from the disturbing influences of the non-illustrated power components of the thyristor wheel T.

The electronic wheel E is formed in detail by a shrouding ring 3, which is laterally flanged to the driving collar N and consequently also lies at ground potential. Structural units 4 are disposed on the inner surface of the shrouding ring 3, and are uniformly divided over the periphery thereof. The structural units 4 contain measuring, control and supply electronics for the rotating thyristor excitation. Therefore, the inner surface of the shrouding ring 3 is formed with a polygonal cross section, so that at each flat surface of the polygon, a respective structural unit 4 can be attached with non-illustrated fastening devices.

Besides the above-mentioned structural units 4, in the region of the electronic wheel E, an inductive signal transmission is provided for the transmission of measuring and control signals to rotating shaft 1 and from shaft 1 to the stationary parts of the apparatus. The inductive signal transmission is disposed on shaft 1 for one transmission direction and on the electronic wheel E for the other transmission direction. Through the shielding effect of the driving collar N, of the thyristor wheel T, and of the electronic wheel E, an undisturbed signal transmission is therefore possible. In detail, for the contactless and brushless transmission of the measuring and control signals, a first inductive signal transmission apparatus 5 and an additional concentric second inductive signal transmission apparatus 6 associated therewith inside the shrouding ring 3, are provided. Therefore, a rotating part 51 of the first inductive signal transmission apparatus 5 is mounted on the outer surface of the shrouding ring 3, while a rotating part 61 of the second inductive signal transmission apparatus 6 is mounted on the shaft 1 in the axial region of shrouding ring 3. Respective stationary parts 52 and 62 of the first and second inductive signal transmission apparatus 5, 6 are mounted to the inner surface of a first supporting cylinder 53 and a second supporting cylinder 63, respectively. The two supporting cylinders 53 and 63 and associated flanges 531 and 631, which are situated over the outside of the axial range or reach of the shrouding ring 3, are fixedly connected with each other and concentrically aligned with each other. In this manner, the two supporting cylinders 53 and 63 are commonly mounted through another flange 532 of the first supporting cylinder 53 to a ring fastener 7 of the machine housing, which surrounds the exciting structure. The electrical shielding of the two inductive signal transmission apparatus 5 and 6 are further improved by the supporting cylinders 53 and 63, which lie at earth potential. In addition, the axial structural length of the entire exciting structure can be considerably reduced through the concentric disposition of the two inductive signal transmission apparatus 5 and 6 and through the concentration of the previously provided positive and negative wheels to one single thyristor wheel T.

For the mounting of the above-described inductive signal transmission apparatus 5 and 6, their rotating parts 51 and 61 are first attached on the shrouding ring 3 and on the shaft 1, respectively, and the shaft is tested for concentricity. After testing of the shaft for concentricity, the first supporting cylinder 53 with the stationary part 52 of the first inductive signal transmission apparatus 5 mounted at the inner surface thereof, is pushed into position and is mounted with its flange 532 to the ring fastener 7 of the machine housing. This mounting is carried out in such a manner that an air gap δ results between the rotating part 51 and the stationary part 52 of the first inductive signal transmission apparatus 5, the air gap being constant in the circumferential direction. In this way, the adjustment and measurement of this air gap δ is not hindered, while the multi-part second supporting cylinder 63 is subsequently assembled over the shaft 1, pushed into position and mounted with its flange 631 to the flange 531 of the first supporting cylinder 53. While the first supporting cylinder 53 and the second supporting cylinder 63 are already mutually concentrically aligned through non-illustrated projections and recesses formed on the flanges 531 and 631, respectively, the necessity of providing a separate adjustment of an air gap ε between the rotating part 61 and the stationary part 62 of the second inductive signal transmission apparatus 6 is avoided. However, control of this air gap ε is possible without further difficulties.

FIG. 2 shows a variation of the device, in which the inductive signal transmission apparatus 5 and 6 are associated with an exciter structure having rotating rectifiers outside of the bearing at the end of a shaft 1'. A shrouding ring 3', which carries the rotating part 51 of the first inductive signal transmission apparatus 5 on its outer surface and carries the structural units 4 on its inner surface, is formed as a one-piece unit with a driving collar N' shrink-fitted on to the shaft 1' in this embodiment. While the shrouding ring 3' extends in an axial direction from the driving collar N' to the end of the shaft 1', an especially easy accessibility results for the mounting of the two inductive signal transmission apparatus 5 and 6. In particular, it is not necessary for the supporting cylinders 53 and 63 to be constructed separately. The supporting cylinders need not be assembled over the shaft 1, but can be pushed into position in axial direction from the outside, by first pushing the first supporting cylinder 53, and after its alignment and mounting, pushing the second supporting cylinder 63. In this way, the first supporting cylinder 53 can be formed as a one-piece, vibration-proof housing, which is mounted and fixed on a base plate and which is aligned in height through packing plates or shims or suitable positioning elements. While in the case of an exciter structure with rotating rectifiers, the two inductive signal transmission apparatus 5 and 6 only serve for the transmission of measuring and control signals, and a drive of the rotating rectifiers is omitted, neither signal transmission apparatus 5 and 6 have to be associated with the rotating rectifiers in axial proximity to the carrier wheel.

FIG. 3 shows, in an enlarged partially sectional view of FIG. 1, the construction and the mounting of the rotating part 61 and the stationary part 62 of the second inductive signal transmission apparatus 6. The rotating part 61 is formed of an inner layer 611, placed on the shaft 1 in radial direction from the inside to the outside, a coil carrier or support 612, which is subdivided in axial direction and in circumferential direction, its outer surface having grooves for accomodating coils 613 and an outer band 614, which is formed of a high strength plastic, such as glass fiber reinforced synthetic or plastic, which serves to absorb centrifugal force stresses. The inner layer 611 and the coil carrier 612 are formed of an insulated, vibration-proof plastic, such as a glass fiber reinforced synthetic or plastic. Cylindrical pins 615 serve as a protection against rotation of the rotating part 61. The pins 615 are disposed in bores formed in the inner layer 611 and in the coil carrier 612, as well as in aligned blind holes formed in the shaft 1, and are held in radial direction by the band 614.

The stationary part 62 of the second inductive signal transmission apparatus 6 is formed of a coil carrier or support 621 provided in radial direction from the inside to the outside, the outer surface thereof having grooves for accomodating coils 622, and an outer layer 623, which lies on the inner surface of the second supporting cylinder 63. The coil carrier 621 and the outer layer 623 again are formed of an insulated, vibration-resistant plactic, such as a glass fiber reinforced synthetic or plastic. For fixing the stationary part 62 in place, radially aligned countersunk screws 624, which are threaded into threads formed in the second supporting cylinder 63, are provided. The heads of the countersunk screws are situated in corresponding countersunk holes formed in the coil carrier 621, in order not to project into the air gap.

The coils 613 of the rotating part 61 and the associated coils 622 of the stationary part 62 are placed in closed circular grooves. These grooves extend partly in the circumferential direction and partly in the axial direction. The coils 613 and 622 are therefore systematically divided in the circumferential and in the axial direction in such a way that in each position of the shaft 1, a constant and undisturbed signal transmission is possible. This occurs through a voltage-frequency conversion in a frequency range from 10 to 100 KHz.

The construction and the mounting of the rotating part 51 and of the stationary part 52 of the first inductive signal transmission apparatus 5 (compare FIG. 1 and FIG. 2) is not specifically represented and described, since the structure corresponds to the construction of the second inductive signal transmission apparatus 6, which is represented in FIG. 3.

The foregoing is a description corresponding to German Application P 32 06 338.5, dated Feb. 22, 1982, the International priority of which is being claimed for the instant application and which is hereby made part of this application. Any discrepancies between the foregoing specification and the aforementioned corresponding German application are to be resolved in favor of the latter.

We claim:

1. Apparatus for the contactless and brushless transmission of measuring and control signals by generators with rotating rectifier or thyristor excitation, comprising a shaft having an outer surface, a driving collar integral with said shaft, a shrouding ring lying at ground potential being integral with said driving collar and rotationally fixed relative to said shaft, said shrouding ring having a given axial range and an outer surface, a first and a second inductive signal transmission apparatus each including respective stationary and rotating parts, said second signal transmission apparatus being disposed concentrically within said first signal transmission apparatus in said given axial range of said shrouding ring, said rotating part of said first signal transmission apparatus being disposed on said outer surface of said shrouding ring, said rotating part of said second signal transmission apparatus being disposed on said outer surface of said shaft, a machine housing, a support cylinder being supported by said machine housing and having an inner surface, said stationary part of said first signal transmission apparatus being disposed on said inner surface of said support cylinder, another support cylinder being supported concentrically in said first-mentioned support cylinder and having an inner surface, said stationary part of said second signal transmission apparatus being disposed on said inner surface of said other support cylinder, and two flanges each being disposed on a respective one of said support cylinders, said flanges being connected to each other outside said given axial range of said shrouding ring.

2. Apparatus according to claim 1, wherein both of said support cylinders are at ground potential.

3. Apparatus for the contactless and brushless transmission of measuring and control signals by generators with rotating rectifier or thyristor excitation, comprising a shaft having an outer surface, a driving collar integral with said shaft, a shrouding ring lying at ground potential being integral with said driving collar and rotationally fixed relative to said shaft, said shrouding ring having a given axial range and an outer surface, a first and a second inductive signal transmission apparatus each including respective stationary and rotating parts, said second signal transmission apparatus being disposed concentrically within said first signal transmission apparatus in said given axial range of said shrouding ring, said rotating part of said first signal transmission apparatus being disposed on said outer surface of said shrouding ring, said rotating part of said second signal transmission apparatus being disposed on said outer surface of said shaft, said rotating part of said first signal transmission apparatus being formed of a coil carrier being banded to said shrouding ring and having an outer surface with grooves formed therein and coils disposed in said grooves, and said rotating part of said second signal transmission apparatus being formed of a coil carrier being banded to said shaft and having an outer surface with grooves formed therein and coils disposed in said grooves.

4. Apparatus for the contactless and brushless transmission of measuring and control signals by generators with rotating rectifier or thyristor excitation, comprising a shaft having an outer surface, a driving collar integral with said shaft, a shrouding ring lying at ground potential being integral with said driving collar and rotationally fixed relative to said shaft, said shrouding ring having a given axial range and an outer surface, a first and a second inductive signal transmission apparatus each including respective stationary and rotating parts, said second signal transmission apparatus being disposed concentrically within said first signal transmission apparatus in said given axial range of said shrouding ring, said rotating part of said first signal transmission apparatus being disposed on said outer surface of said shrouding ring, said rotating part of said second signal transmission apparatus being disposed on said outer surface of said shaft, and said shrouding ring having an inner surface, and including structural units disposed on said inner surface for containing measuring, control and supply electronics for the rotating rectifier or thyristor excitation.

5. Apparatus according to claim 4, wherein said inner surface of said shrouding ring is in the form of a polygon having flat surfaces each having a respective one of said structural units disposed thereon.

6. Apparatus for the contactless and brushless transmission of measuring and control signals by generators with rotating rectifier or thyristor excitation, comprising a shaft having an outer surface, a driving collar integral with said shaft, a shrouding ring lying at ground potential being integral with said driving collar and rotationally fixed relative to said shaft, said shrouding ring having a given axial range and an outer surface, a first and a second inductive signal transmission apparatus each including respective stationary and rotating parts, said second signal transmission apparatus being disposed concentrically within said first signal transmission apparatus in said given axial range of said shrouding ring, said rotating part of said first signal transmission apparatus being disposed on said outer surface of said shrouding ring, said rotating part of said second signal transmission apparatus being disposed on said outer surface of said shaft, said shaft having an end and being part of an exciter machine having a rotating rectifier apparatus, said driving collar being disposed on the opposite side of said rotating rectifier apparatus of said exciter machine in vicinity of said end of said shaft and said shrouding ring being extended toward said end of said shaft in axial direction.

7. Apparatus according to claim 10, wherein said driving collar has two sides, and including a thyristor wheel disposed on one of said sides of said driving collar, said shrouding ring being disposed on the other of said sides of said driving collar.

* * * * *